Patented July 17, 1951

2,560,939

UNITED STATES PATENT OFFICE 2,560,939

2,2-METHYLENEBIS(4-CHLORO-6-ACETAMIDOPHENOL) AND A METHOD FOR ITS PRODUCTION

Herman E. Faith, New Palestine, Ind., assignor to Allied Laboratories, Inc., Kansas City, Mo., a corporation of Delaware No Drawing. Application June 23, 1950,
Serial No. 170,036

2 Claims. (Cl. 260—562)

The present invention relates to the new compound 2,2'-methylenebis(4-chloro-6-acetamidophenol) and a method for its preparation.

My new compound 2,2'-methylenebis(4-chloro-6-acetamidophenol) possesses antifungal action, and, in addition, is valuable as an intermediate for the preparation of more complex organic derivatives.

A suitable method for the production of the compound of this invention will be described in detail in connection with the following specific example:

STEP 1

*Preparation of 2,2'-methylenebis(4-chloro-6-nitrophenol)*

Sixty-eight grams of 2,2'-methylenebis(4-chlorophenol) are dissolved in 550 ml. of glacial acetic acid and 33.8 g. of fuming nitric acid (d. 1.5) in 50 ml. of glacial acetic acid are added gradually. The temperature is kept at 10–15° C. during the addition; then, the mixture is stirred at 25–30° C. for 1.5 hours. It is cooled and the product is collected by filtration.

STEP 2

*Preparation of 2,2'-methylenebis(4-chloro-6-aminophenol)*

Sixteen grams of hydrogen chloride are dissolved in 28 ml. of 95% ethanol. To this cold solution are added 20.6 g. of stannous chloride dihydrate. Then 5 g. of 2,2'-methylenebis(4-chloro-6-nitrophenol) are stirred into the solution at 25° C. The temperature rises gradually to 35° C. From this point, the temperature rise is controlled by an ice bath to keep the mixture from getting hotter than 80° C. The mixture is heated at 80° C. for one hour, cooled and filtered. The solid product is dissolved in water and hydrogen sulfide is introduced to precipitate tin sulfide. The sulfide is filtered from the solution, and the filtrate is neutralized to pH 5 with sodium hydroxide solution. The precipitate is dissolved in dilute hydrochloric acid, stirred with activated charcoal, and precipitated again by neutralizing with sodium hydroxide.

STEP 3

*Preparation of 2,2'-methylenebis(4-chloro-6-acetamidophenol)*

2,2' - methylenebis(4 - chloro-6-aminophenol) (29.9 g.) is dissolved in a solution of 18 ml. of concentrated hydrochloric acid in 500 ml. of water. The solution is warmed to 40° C., and 235 ml. of acetic anhydride are added with stirring. A solution of 31 g. of sodium acetate in 100 ml. of water is added and stirred at 38–40° C. for 1.5 hours. The precipitate is collected by filtration and washed with water. It is soluble in aqueous sodium hydroxide solution. It crystallizes from aqueous ethanol solution. When heated at 228–229° C., it melts with decomposition.

I claim:

1. The compound 2,2'-methylenebis(4-chloro-6-acetamidophenol).

2. The process for the preparation of 2,2'-methylenebis(4 - chloro - 6 - acetamidophenol) which comprises acetylating 2,2-methylenebis(4-chloro-6-aminophenol) by treatment with acetic anhydride.

HERMAN E. FAITH.

No references cited.